United States Patent [19]

Robishaw et al.

[11] Patent Number: 4,809,636
[45] Date of Patent: Mar. 7, 1989

[54] CONSTRUCTION TRANSPORTATION ASSEMBLY

[75] Inventors: Paul A. Robishaw, Houston, Tex.; Reginald B. Page, Folsom, Calif.

[73] Assignee: Robishaw Engineering, Inc., Houston, Tex.

[21] Appl. No.: 108,014

[22] Filed: Oct. 12, 1987

Related U.S. Application Data

[63] Continuation-in-part of Ser. No. 757,631, Jul. 22, 1985, abandoned, which is a continuation-in-part of Ser. No. 642,181, Aug. 17, 1984, Pat. No. 4,610,215.

[51] Int. Cl.⁴ .................................................. B60P 7/13
[52] U.S. Cl. ..................................... 114/267; 414/786; 280/408
[58] Field of Search ................... 114/26, 28, 249, 266, 114/267, 77 A, 77 R; 52/585, 587; 14/2.6, 27, 75; 405/203, 204, 218, 219; 403/292, 316, 317, 324, 328; 410/78; 280/408, DIG. 8; 414/139, 786; 220/1.5, 23.6

[56] References Cited

U.S. PATENT DOCUMENTS

| | | | |
|---|---|---|---|
| 3,057,315 | 10/1962 | Robishaw | 114/267 |
| 3,107,024 | 10/1963 | Johnson et al. | 414/786 |
| 3,430,601 | 3/1969 | Thompson | 114/267 |
| 3,614,938 | 10/1971 | Statile | 114/249 |
| 3,691,974 | 9/1972 | Seiford, Sr. et al. | 114/267 |
| 3,711,902 | 1/1973 | Eggert, Jr. | 24/81 |
| 3,799,100 | 3/1974 | Marriner | 114/235 |
| 3,805,721 | 4/1974 | Robishaw | 114/267 |
| 3,818,854 | 6/1974 | Marriner | 114/235 |
| 3,822,667 | 7/1974 | Marriner | 114/235 |
| 3,827,407 | 8/1974 | Stratienko et al. | 114/235 |
| 3,872,555 | 3/1975 | Link et al. | 24/221 R |
| 3,938,461 | 2/1976 | Marriner | 114/235 |
| 3,980,185 | 9/1976 | Cain | 214/10.5 |
| 4,060,048 | 11/1977 | Breheret et al. | 114/266 |
| 4,290,382 | 9/1981 | Conti et al. | 114/266 |
| 4,294,185 | 10/1981 | Nordstrom et al. | 114/75 |
| 4,339,148 | 7/1982 | Smith et al. | 296/35.3 |
| 4,431,368 | 2/1984 | Katz et al. | 414/786 |
| 4,610,215 | 9/1986 | Robishaw et al. | 114/249 |

FOREIGN PATENT DOCUMENTS 2651247 5/1978 Fed. Rep. of Germany.
2725060 12/1983 Fed. Rep. of Germany.

OTHER PUBLICATIONS

ISO Container Dimensions and Ratings, Four Pages.
Inter Equipos Navales, S. A. Catalog, pp. 1–3 and 58, Undated.

Primary Examiner—Peters, Jr. Joseph F.
Assistant Examiner—Edwin L. Swinehart
Attorney, Agent, or Firm—Browning, Bushman, Zamecki & Anderson

[57] ABSTRACT

A construction transportation assembly comprising a buoyant general construction component having eight corner portions defining a rectangular parallelpiped locus with a length and a width generally corresponding to those of an ISO standard freight container, and two specialty components mounted on top of the general component laterally adjacent each other and lying within the length and width of the locus.

16 Claims, 4 Drawing Sheets

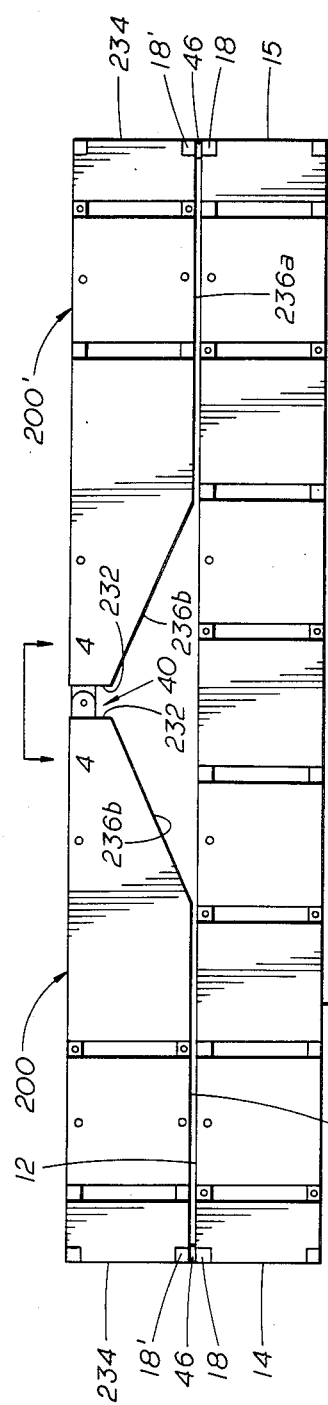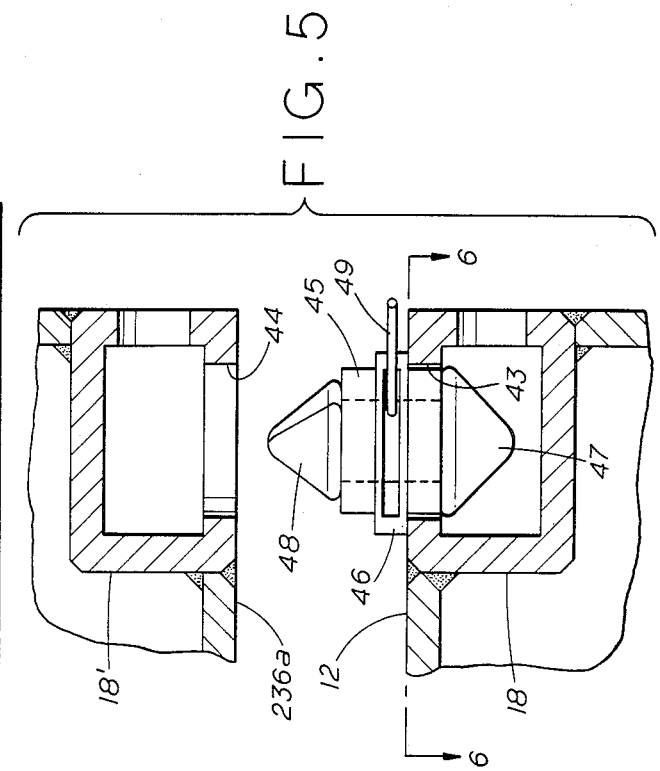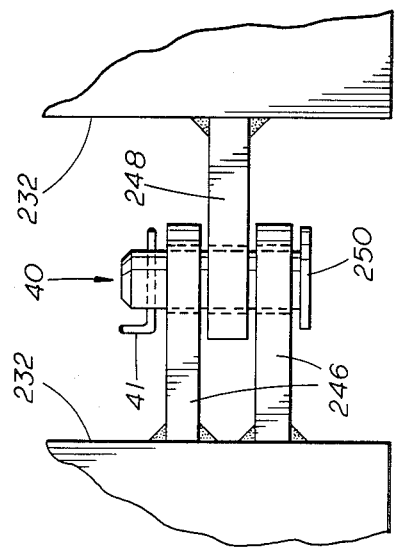

CONSTRUCTION TRANSPORTATION ASSEMBLY

CROSS REFERENCE

This is a continuation-in-part application of co-pending U.S. patent application Ser. No. 757,631 filed July 22, 1985, now abandoned, which in turn is a continuation-in-part of U.S. patent application Ser. No. 642,181 filed Aug. 17, 1984, now U.S. Pat. No. 4,610,215.

BACKGROUND OF THE INVENTION

The present invention pertains to buoyant construction components which may be locked together in various configurations for transportation and/or to form structures such as bridges, platforms, barges and the like. Prior U.S. Pat. Nos. 2,876,726, 3,057,315, and 3,805,721 describe a series of successive developments in such construction components and special locks therefor. The present invention provides further improvements in such construction components.

In modern international commerce, there is widespread use of what are termed "standard freight containers." Such a container is generally in the form of a rectangular parallelepiped. It not only has standardized external dimensions, but in addition, usually includes a standard form of corner fitting which may be engaged by standardized tools and the like for both lifting and moving the container, for lashing it in place in various locations, for connecting it to other containers, etc. Freigt handling facilities, e.g. at seaports, throughout the world, have been equipped with such standardized lifting and moving equipment, whereas freight vehicles, such as ships, have been equipped with standard sized racks used in aligning and retaining such containers. Such standardization, on an international scale, has vastly facilitated the shipping and handling of many types of freight which can be packed in the containers.

Coinciding with the above developments in freight handling equipment and practices, is the need for transporting construction components of the type generally exemplified by the aforementioned prior U.S. patents to the locations at which they will be used. Such transport could be greatly facilitated and the cost thereof reduced if the construction components could be handled and shipped in the same manner as standard freight containers.

The generally rectangular parallelepiped configuration of such prior art components would readily lend itself to such handling, but problems were presented by the fact that the lock assemblies carried by the components included protruding pin members. This problem was solved by the retractable pin locks disclosed in prior U.S. Pat. No. 4,610,215 and application Ser. No. 757,631, which are hereby expressly incorporated herein by reference.

In a typical construction system of the type generally contemplated, a majority of the construction components would typically be of the type generally disclosed in the aforementioned prior U.S. patents, i.e. large "building blocks" of a relatively simple parallelepiped form. However, in most installations or constructions, there is also need for certain relatively specialized components, e.g. components adapted to take load bearing pilings or holding spuds, and/or components having raked or ramp-like tapers at one end. Such modifications to the basic construction components are often expensive, and in addition, may present additional problems in the context of transporting and handling the modified components. For example, the modifications of the components may cause them to include protrusions or deviations from rectangular parallelepiped gross profile, whereby they cannot be readily handled as standard freight containers.

As compared with the general construction components, the specialized construction components, especially the rake components, are preferably somewhat smaller than standard freight containers. Nevertheless, it is not practical to place these specialized components within standard freight containers for transportation. Our prior U.S. application Ser. No. 757,631 disclosed a system whereby two or more of these smaller components could be connected together, in some cases along with other auxiliary elements of the transportation system, to form an assembly which, in turn, could be handled and shipped as a standard freight container. Then, when the assembly reaches the construction site, the components can be disconnected from the transportation configuration and reconnected with one another and/or with additional components, of either the general or specialized type, in different configurations so as to form the structure being constructed.

Thus, each transport assembly of the overall system has gross dimensions generally corresponding to those of a standard freight container and includes at least two of the smaller specialized construction components. Each of these two specialized components has a first gross dimension with a maximum value generally equal to $C_1/x$, where $C_1$ is the width of a standard freight container, and x is greater than or equal to 1. Preferably, x is an integer, and even more preferably, x is equal to 1. Thus, the first dimension of the component is preferably equal to the width of a standard freight container.

Each of the specialized components further has a second gross dimension, perpendicular to the first dimension, whose maximum value is generally equal to $C_2/y$, where $C_2$ is the length of a standard freight container, and y is greater than 1. Thus, the second dimension is less than the length of a standard freight container. Preferably, y is greater than 2, whereby the second dimension of the component is less than or equal to half the length of a standard freight container.

Accordingly, several such components can be aligned lengthwise, with appropriate spacers therebetween if necessary, to form an assembly having the length of a standard freight container. As previously mentioned, the width of each such component is preferably equal to the width of a standard freight container. The components can be connected in such configuration, either directly, or via the aforementioned spacers, to form an assembly which can be handled and transported in the same manner as a standard freight container.

The third gross dimension, of the individual components as well as the overall assembly, can vary as desired, from one assembly to the next, and even within a given component, because the dimensions of freight containers which are standardized include only the length and width, but not the depth.

More specifically, as to the rake components, prior application Ser. No. 757,631 disclosed transport assemblies in which two rake components were connected in a "nose-to-nose" manner, i.e. with their shallow ends facing each other. It is possible, by connecting rake components in this manner, to form a transport assembly having gross dimensions generally corresponding to those of the standard freight container, and which can be shipped and handled as such. However, it has been found that, in doing so, excessive forces may be imposed on the connections between the shallow ends of the components, and this can result in damage to the connection means and/or the components themselves.

It would be possible to further brace the rake components with respect to each other, but any braces used for this purpose would then represent extraneous and otherwise useless, but relatively large, pieces which would have to be disposed of or otherwise dealt with at the construction site. The kinds of construction sites in which such components are used may be primitive and/or remote, having access problems, and otherwise susceptible to making the removal and disposal of such braces unusually problematic.

SUMMARY OF THE INVENTION

In accord with the present invention, transport assemblies are formed utilizing one general construction component, typically having a rectangular parallelepiped configuration with dimensions generally corresponding to those of a standard freight container, along with two rake components. The rake components are mounted on top of the general component, in a "nose-to-nose" type configuration, extending lengthwise along the general component. Thus, the deep end of each rake component is disposed adjacent a respective end of the general component, with the two shallow ends of the rake components facing each other about mid-way between the ends of the general component.

The rake components are connected to the general component, preferably by primary connection means cooperative between the contiguous corner portions of the rake components and general component, respectively, at the outer ends thereof. Even more preferably, these adjacent corner portions are provided with standard ISO container corner fittings, and the primary connection means may, conveniently, be of a type already available and commonly used for interconnecting standard freight containers, e.g. on transport ships.

Furthermore, secondary connection means are preferably provided to stabilize the assembly and prevent the rake components from moving relative to the general component. The secondary connection means used for this purpose may connect the rake components to each other adjacent their shallow ends. Alternatively, the secondary connection means may connect each rake component, respectively, to the general component inboard of the ends where the primary connection means are disposed. When this is done, the facing shallow ends of the rake components need not be directly connected, and may even be spaced apart. This is particularly advantageous in those cases in which the shallow ends of the rake components are provided with specialized fittings or other protrusions which could make direct connection, or even abutment, problematic.

It can be appreciated that this scheme not only eliminates excessive forces from being imposed on any connections, e.g. the ones between the shallow ends of the rake components, but even eliminates the need for any connection adjacent the shallow ends of the rake components.

Furthermore, the general component used to rigidify the assembly of rake components and provide additional connection sites does not represent extraneous apparatus at the construction site, but on the contrary, is itself another component of the overall construction system. The connection means are relatively small and do not pose the same kinds of problems as a larger bracing framework might cause.

Not only are the general components used at the construction site, but in many applications, it is desirable for each general construction component to be used with a pair of rake components, to form a subassembly of the structure being built. Thus, the formation of a transport assembly according to the present invention automatically provides the three major parts of each subassembly in a preassembled package. This eliminates any amount of trouble which might otherwise be involved if, for example, a large number of rake components were shipped in pairs, general components separately shipped, or shipped and unloaded distal the rake components, with these components then having to be regrouped into subassemblies each consisting of a general component and two rake components.

Accordingly, a principal object of the present invention is to provide an improved construction transportation assembly for rake components.

Another object of the present invention is to provide such an assembly which further incorporates a general construction component.

Still another object of the present invention is to provide such an assembly having gross dimensions generally corresponding to those of a standard freight container, so that it can be shipped and handled as such.

Still another object of the present invention is to provide such an assembly which minimizes the use of parts other than construction components, and to the extent that such parts are necessary, utilizes small, simple, and/or readily available parts.

Still other objects, features and advantages of the present invention will be made apparent by the following detailed description, the drawings and the claims.

BRIEF DESCRIPTION OF THE DRAWINGS

FIG. 3 is a side elevation view of a transport assembly according to the present invention.

FIG. 4 is a detail plan view taken on line 4—4 of FIG. 3.

FIG. 5 is a partially exploded vertical detail view, partly in section, of a primary corner connection.

DETAILED DESCRIPTION OF THE PREFERRED EMBODIMENT

Figure 1:
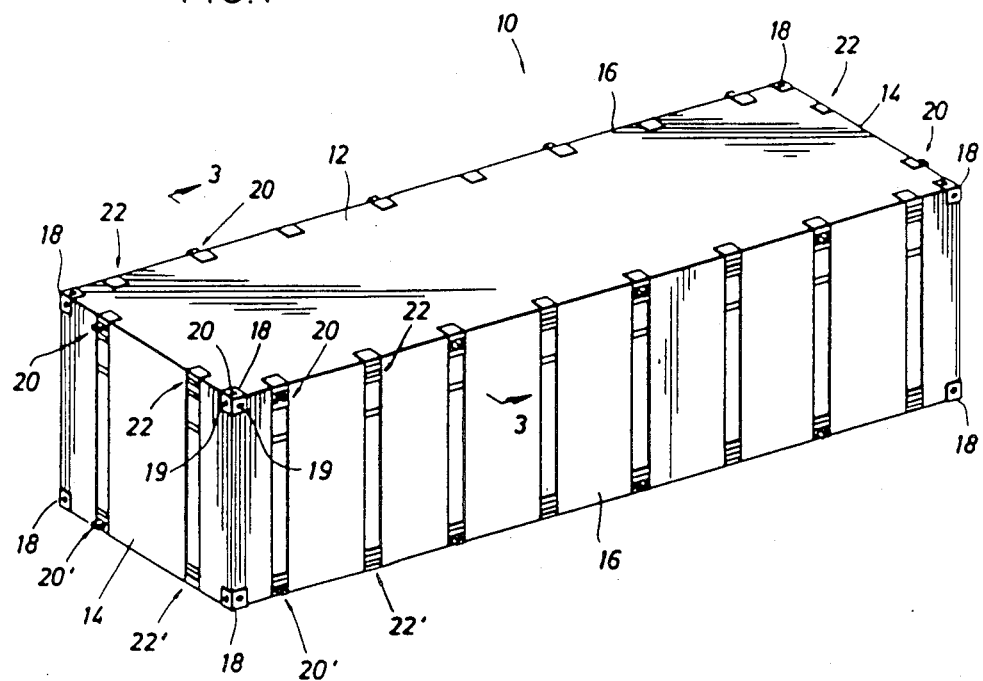
FIG. 1 is a perspective view of a general construction component for use in the present invention.

FIG. 1 represents a general construction component 10 of the type disclosed in prior U.S. Pat. No. 4,610,215.

It may also be assumed to incorporate the various features disclosed in prior U.S. Pat. Nos. 2,876,726, 3,057,315, and 3,805,721, which are hereby expressly incorporated herein by reference.

The construction component 10, as shown, is a buoyant type, so that it may be used in constructing floating bridges, barges, floating piers or docks, floating platforms, and the like. It will be appreciated, however, that the component 10, along with similar components, could likewise be used in the construction of various non-floating structures, such as land supported bridges, platforms, etc.

More specifically, component 10 is in the form of a rectangular parallelepiped. Component 10 includes an internal force bearing framework of the type shown in FIG. 3 of U.S. Pat. No. 4,610,215. The framework is generally encased within an outer covering including an upper wall 12, a lower wall 13, and four lateral walls. The lateral walls in turn are subdivided into first and second end walls 14 and 15 and first and second side walls 16 and 17. The upper and lower walls 12 and 13 will also be referred to herein as the "bases" of the component.

Component 10 has mutually perpendicular length, width and depth. The length is defined as extending between the ends 14 and 15; the width is defined as extending between the sides 16 and 17, and the depth is defined as extending between the bases 12 and 13. It may also be said that the bases 12 and 13 extend along the length and width of the component 10, that the sides 16 and 17 extend between the bases 12 and 13 and along the length and depth of the component 10, and that the ends 14 and 15 extend between the bases 12 and 13 and along the width and depth of the component 10.

In each corner of the component 10, there is mounted an ISO standard container fitting 18. Such fittings are well known, and in particular, are of the same type which are used in the corners of standard freight containers. Each of the fittings 18 has three intersecting bores, to be described more fully below, into which lifting tools, lash lines and the like can be inserted for lifting and handling the component 10, lashing it in place in racks on a freighter, and otherwise handling the component 10 in the same manner as standard freight containers are handled.

The gross dimensions of component 10, measured between the outer surfaces of its various pairs of opposite walls, at their corner fittings, generally correspond to those of an ISO standard freight container. For example, the gross dimensions of component 10 may correspond to those of any of the standard size containers listed in the leaflet "ISO Container Dimensions" filed herewith and hereby expressly incorporated by reference. Metric units are used in said leaflet. For convenience, ISO standard container lengths and widths in British units are set forth herein as follows:

| | Tolerance |
|---|---|
| Container Length: | |
| 9'9¾" | +0" −3/16" |
| 19'10½" | +0" −¼" |
| 29'11¼" | +0" −⅜" |
| 40' | +0" −⅜" |
| Container Width: | |

| | Tolerance |
|---|---|
| 8' | +0" −⅜" |

It is noted that the ISO standard width of 8 foot is common to all container sizes.

Most of the facilities for handling standard freight containers today require standardization only as to the length and width of such containers, whereas vertical depth is not critical. For example, it can be appreciated that, in a storage rack for holding such containers on shipboard, vertical depth would not be critical, as the containers simply stack on top of one another. However, length and width would have to be standardized in order for the containers to fit properly in the racks. Thus, for such standardized systems, a component such as the component 10 would be considered to have gross dimensions generally corresponding to those of a standard freight container if its length and width are approximately equal to the length and width of a standard freight container. However, if for some particular installation, or in some future freight handling system, there is a need to standardize vertical depth, the present invention contemplates that the depth of the components according to the present invention could likewise be chosen to fit such standards.

When it is said that the gross dimensions of component 10 "generally" correspond to those of a standard freight container, it is meant that any projections formed, as by the various parts of the lock assemblies to be described hereinafter, when those lock assemblies are placed in suitable positions for transport, do not project beyond the outer surfaces of the walls of component 10 by distances such as to interfere with the shipping and handling of component 10 in generally the same manner as a standard freight container. This is a pragmatic functional standard, and is not necessarily limited by the tolerances in the above table.

A plurality of upper and lower male lock assemblies 20 and 20', respectively, and upper and lower female lock assemblies 22 and 22', respectively, are carried adjacent the upper and lower edges of the lateral walls, i.e. end walls 14 and 15 and side walls 16 and 17. The lock assemblies are arranged in tandem pairs, the assemblies of each pair being vertically spaced so that they are disposed respectively adjacent the upper and lower edges of the particular lateral wall on which they are located. Terms such as "vertical," "horizontal," "top," "upper," and "lower" are used herein for convenience, they refer to the apparatus as shown and as normally used, and should not be construed as further limiting the scope. The assemblies of each pair are of the same gender, and the male and female assemblies are alternated along the length of each lateral wall, and are of an even number. Thus, on each end wall 14 there are two pairs of assemblies, one pair of male assemblies 20 and 20' and one pair of female assemblies 22 15 and 22'.

Furthermore, the male assemblies 20 and 20' on one of the end walls 14 are disposed across from and aligned with the female assemblies 22 and 22' of the other of the end walls 14. Thus, as may be seen in FIG. 2, one end of a component 10 can be aligned with either end of another similar component 10, and the male assemblies of each of said ends will automatically be aligned with the female assemblies of the other of said ends so that the two can be connected. Similarly, there are eight pairs of lock assemblies, alternately male and female, arranged along the length of each of the side walls 16, and each male assembly on one side of the construction component is located across from a female assembly on the other side. Thus, a given side of a component 10 can be connected to either side of another similar component 10.

Figure 2:
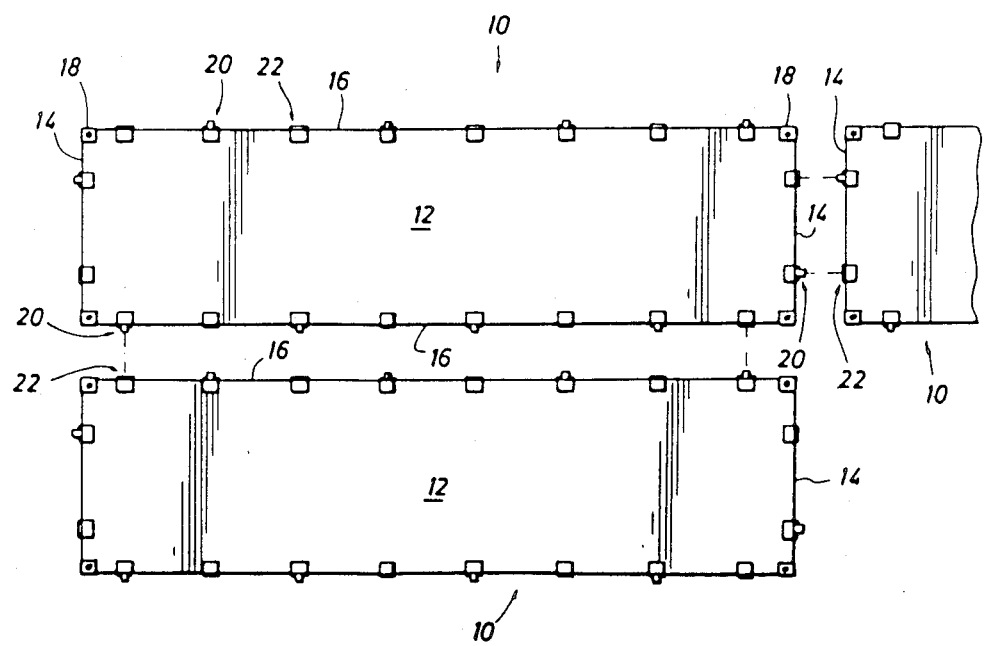
FIG. 2 is a top plan view of several construction components, of the type illustrated in FIG. 1, positioned for prospective connection in one of several possible configurations.
Figure 6:
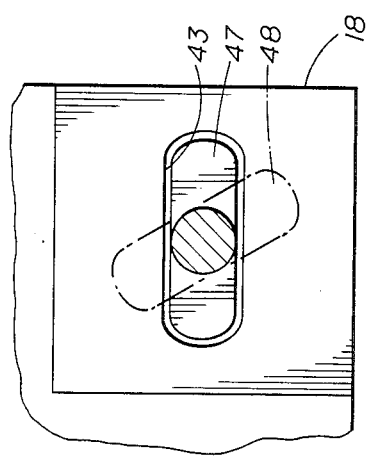
FIG. 6 is a schematic view on line 6—6 of FIG. 5.
Figure 7:
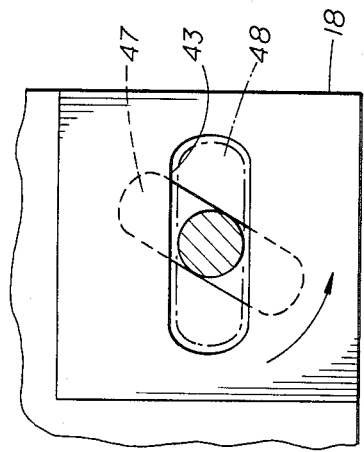
FIG. 7 is a view similar to that of FIG. 6 showing the parts in a different position.

This differs from the arrangements disclosed in said prior U.S. Pat. Nos. 2,876,726, 3,057,315 and 3,805,721, wherein all of the assemblies in any given side of the device were of the same gender, and consequently, a given end or side of one component could only be connected to one end or one side of a similar component. Of course, it will be appreciated that FIG. 2 illustrates only one, and that a relatively simple one, of the many configurations in which such components can be connected. It will be noted, in particular, that among the variations are those in which components are connected end-to-side and those in which they are connected side-to-side, but in an offset or staggered manner.

As previously mentioned, the construction component 10 includes an internal structural framework which, as more fully described in the aforementioned prior U.S. patents, may include a plurality of interconnected trusses. As mentioned, each tandem pair of male assemblies on one side of the construction component is located across from a tandem pair of female assemblies on the other side of the component. Such complementary pairs of male and female lock assemblies are mounted at opposite ends of a given truss.

The lock assemblies 20, 20', 22 and 22' are of the type shown in FIGS. 4–10 of prior U.S. Pat. No. 4,610,215. Briefly, it is noted that the male lock assemblies are adapted to hold the pins in retracted positions for transport and handling, wherein the pins do not extend outwardly from the component, or at least do not extend by a distance sufficient to impair handling of the component in the manner of a standard freight container. Likewise, the male lock assemblies can be reset to hold the pins in an advanced position for mating with female lock assemblies to connect the components to form a desired structure.

Figure 11:
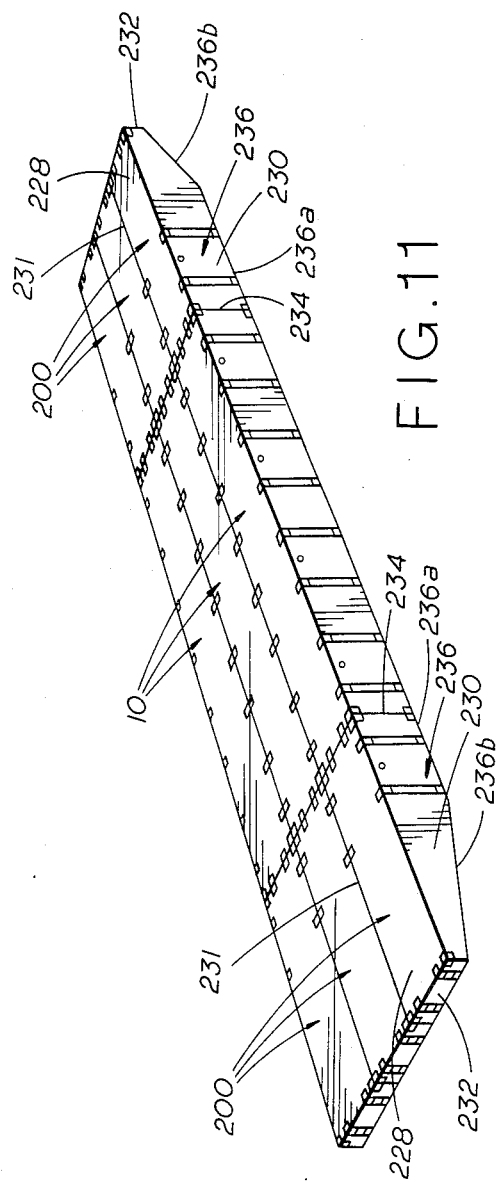
FIG. 11 is a perspective view of a barge formed of components of transport assemblies such as those of FIGS. 3 and 9.

In addition to the general components 10, a complete system according to the present invention may also include various specialized components. FIG. 11 illustrates a barge comprising a central span of three laterally connected general construction components 10 and two spans each comprising three laterally connected rake components 200. The spans of rake components 200 are connected to respective opposite ends of the span of general components to form the barge, all connections being made by the lock assemblies 20, 20', 22 and 22' in the manner described more fully in prior U.S. Pat. No. 4,610,215. The rake components 200 will be described more fully below. Briefly, it is noted that each rake component has a deep end 234 and a shallow end 232. However, as used herein, the term "rake component" will generally refer to the types of components illustrated at 00 as well as to ramp-like components which are tapered even more to form a more nearly pointed shallow end. In each span, the rake components 200 are connected with their shallow ends aligned and their deep ends aligned, and the span as a whole is connected via its deep ends to the end of the span of general components 10.

More specifically, each of the rake components 200 has a configuration which may be described as a rectangular parallelepiped reduced by an angular cut along the lower edge of one of its ends. Like the general components, each rake component 200 has mutually perpendicular length, width and depth. The rake component has oppositely directed bases, more specifically a top 228 and a bottom 236, extending along the length and width, first and second oppositely directed sides 230 and 231 extending between the bases 228 and 236 along the length and depth, and the aforementioned deep and shallow oppositely directed ends 234 and 232 extending between the bases 228 and 236 along the width and depth. In the preferred embodiment shown, the lateral walls or sides and ends lie generally perpendicular to the top 228. Also, the width is substantially uniform along the length. However, the depth is graduated. Thus, the bottom 236 has a first portion 236a adjacent deep end 234 which is generally rectangular in configuration and lies parallel to top 228. A second portion 236b of bottom 236 adjoins portion 236a intermediate the ends 234 and 232 and is inclined toward top 228 from that juncture to the shallow end 232.

The maximum depth of each rake component 200, i.e. the depth at its deep end 234, is the same as the depth of each of the general components 10. Such depth should be sufficient to allow the components to be used to form a barge or the like which will have an adequate draft. For most usages now contemplated for these components, a depth of at least 3 to 4 feet in the general components and the deep ends of the rake components is preferred.

Like the general components, the rake components have lock assemblies 20, 20', 22 and 22' mounted on their side walls 230 and 231 and at least the deep end wall 234. Shallow end wall 232 may or may not include such lock assemblies, as explained in prior application Ser. No. 757,631.

As previously mentioned, each of the general components 10 can be shipped and handled in the manner of a standard freight container, since it has corresponding dimensions. Specialty components, such as rake components 200, cannot, as a practical matter, be sized and shaped for handling of individual rake components in the manner of a standard freight container. However, if the dimensions of the rake components are properly chosen, they can remain practical for their own intended purpose, and yet be combinable into transport assemblies, which assemblies can be shipped and handled as standard freight containers.

The requirements for sizing can be generalized as follows:

Each such component must have a first horizontal dimension with a maximum value generally equal to $C_1/x$, where $C_1$ is the width of a standard freight container, and x is greater than or equal to 1. In other words, the first dimension of each component must be less than or equal to the width of a standard freight container. However, it is highly preferable that x be an integer, and in most cases, that x be equal to 1.

Each component should have a second horizontal dimension, measured perpendicular to the first dimension, having a maximum value generally equal to $C_2/y$, where $C_2$ is the length of a standard freight container, and y is greater than 1, i.e. the second dimension of the component should be less than the length of a standard freight container. It is often preferable that y be greater than or equal to 2, so that at least two such components can be joined together lengthwise in each transport assembly.

The rake components 200 meet these criteria. The first horizontal dimension in question is the width of the rake component, which is equal to the width of general component 10, and thus also equal to the width of a standard freight container. The second horizontal dimension of the rake component 200 is its length, which is less than or equal to one half the length of a standard freight container and, more specifically, that standard freight container length which corresponds to the length of general component 10.

As explained more fully in application Ser. No. 757,631, such rake components can be connected via their shallow ends, i.e. in a "nose-to-nose" fashion as described in connection with FIGS. 14–19 of said application. The resulting transport assembly can be shipped and handled in the manner of a standard freight container. However, in at least some instances, excessive forces may be imposed on the connections of such assemblies, and this could result in damage.

Furthermore, for many applications, such as that shown in FIG. 11, the ultimate structure to be built uses general components 10 in subassemblies such that each component 10 has a pair of rake components 200 connected to its opposite ends. For such applications, it is particularly convenient that such subassemblies, each consisting of a general component and two rake components, be "packaged" together in a transport assembly. In other words, components which will be used together are shipped together.

FIG. 3 shows a transport assembly that achieves both of the above goals, i.e. eliminating excessive and/or damaging forces on the nose-to-nose connection, while packaging each pair of rake components together with a general component. The two rake components of FIG. 3 are identical, but in order to distinguish one from the other, one has been numbered 200, while the other has been numbered 200'.

In the transport assembly, the general component 10 is placed in its usual position, i.e. with its top 12 uppermost. The first rake component 200 is placed upon component 10 with first portion 236a of the bottom of component 200 facing, and indeed resting upon, top 12 of component 10. Deep end 234 of component 200 is aligned with first end 14 of component 10. Component 200 lies lengthwise along component 10, so that its shallow end 232 is positioned approximately half way between the ends 14 and 15 of component 10.

The second rake component 200' of the assembly is placed in mirror image fashion. More specifically, first portion 236a of its bottom rests upon top 12 of component 10. Deep end 234 of component 200' is aligned with second end 15 of component 10, while shallow end 232 of component 200' lies about half way between the ends 14 and 15 of component 10, facing and adjacent the shallow end of component 200.

Figure 8:
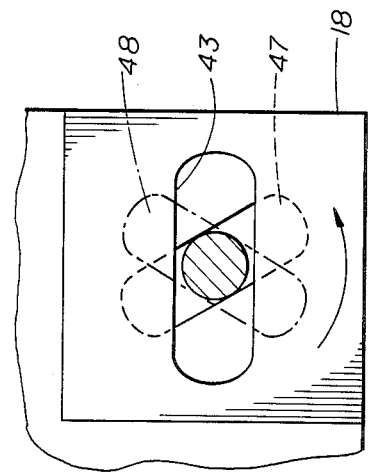
FIG. 8 is a view similar to those of FIGS. 6 and 7 showing the parts in still another position.

The shallow ends 232 of the rake components are connected by means 40 generally of the type shown in FIGS. 8 and 19 of prior application Ser. No. 757,631. Referring to FIG. 4, the end 232 of each rake component carries toward one side a clevis 246, and toward the other lateral edge, a tongue 248. When the components 200 and 200' are placed with their ends 232 facing each other, each tongue 248 can be received in the clevis 246 of the opposite component. Then, the tongues and clevises can be pinned together by pins 250, held in place in any suitable manner, as by cotter pin 41.

Referring again to FIG. 3, it can be seen that each of the upper corners of component 10 is disposed adjacent or contiguous to one of the lower corners of the deep ends of the rake components. The rake components 200 and 200' are connected to the general component 10 at these adjacent corners by means shown more specifically in FIGS. 5–8. As previously mentioned, these corners are provided with ISO standard corner fittings. Such corner fittings are well known in the art.

Briefly, and referring to FIG. 5, the corner fitting 18 in each upper corner of the component 10 has an elongate slot 43 through its upper wall. The fitting 18' in the adjacent lower corner of the rake component is a mirror image, having elongate slot 44. The two corner fittings are connected by a type of lock, often called a "twist lock," well known in the art for connecting standard freight containers to one another. Exemplary twist locks are disclosed in the Inter Equipos Navales catalog excerpt filed herewith and expressly incorporated herein by reference. Briefly, each twist lock includes a housing, formed in two parts, bolted together, with a vertical parting plane. The housing 45 includes lateral flanges 46 wide enough to resist passage through slots 43 and 44. A shaft (not shown) is rotatably mounted in the housing on a vertical axis. The ends of the shaft are exposed through the upper and lower ends of the housing 45 and carry respective locking heads 47 and 48 on the outside of housing 45. Housing 45 also has a lateral slot through which a handle 49 attached to the shaft protrudes. The heads 47 and 48 are not parallel to each other, but rather, are disposed at a slight angle, as shown.

Fitting 18 is box-like in form, with a hollow interior. Thus, head 47 and the adjacent portion of housing 45 can be emplaced into slot 43. When flange 46 comes into abutment with the upper surface of fitting 18, thereby preventing further downward movement, head 47 will be disposed just beneath the inner surface of the wall in which slot 43 is formed. Then, the handle 49 can be used to rotate the shaft slightly, to move the lock from the position of FIG. 6 to the position of FIG. 7, so that head 47 is no longer aligned with slot 43, and the twist lock cannot be removed from fitting 18. This movement should be performed so that upper head 48 will now be aligned for insertion in slot 44 of fitting 18'. This insertion occurs as the rake component in question is lowered down onto the top of the general component 10. Then, handle 49 can be further rotated to the position of FIG. 8 in which head 48 is no longer aligned with slot 44, and the two corner fittings 18 and 18' are thereby locked together.

It can be appreciated that, when the transport assembly of FIG. 3 is fully connected, the rake components 200 and 200' lie within the rectangular profile of top 12 of component 10, i.e. within its length and width, and thus within the profile of an ISO standard freight container. Since depths of freight containers are generally optional, the entire assembly can then be shipped and otherwise handled in the manner of a standard freight container.

Figure 9:
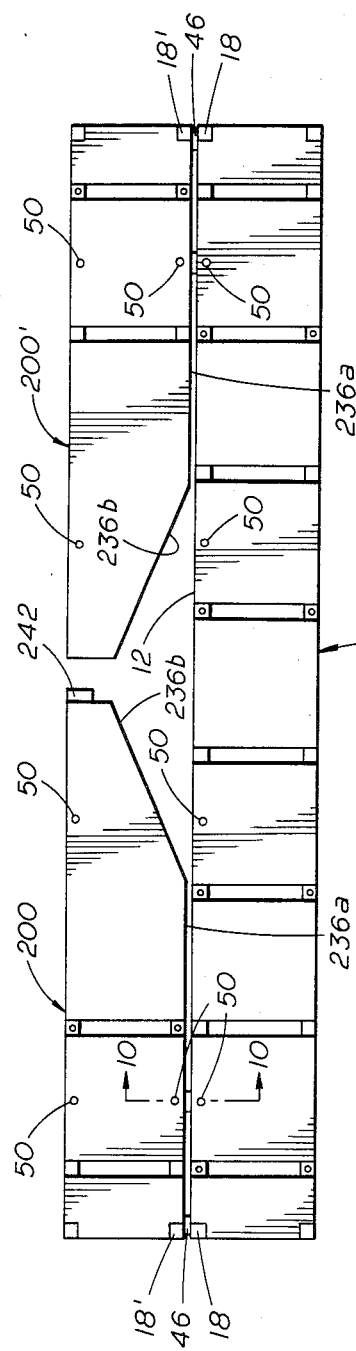
FIG. 9 is a view similar to that of FIG. 3 showing another embodiment

FIG. 9 shows another embodiment of a similar transport assembly comprised of a general component 10 and two rake components 200 and 200', positioned with respect to each other in precisely the same manner as the embodiment of FIG. 3, and having adjacent corners connected by twist locks, also in a manner identical to the embodiment of FIG. 3. However, the embodiment of FIG. 9 eliminates a direct nose-to-nose type connection between the shallow ends of the two rake components and, instead, uses a further connection between the rake components and the general components, inboard of the adjacent corner fittings 18 and 18'. Such an assembly might be used, for example, if the rake components in question have their shallow ends equipped with some type of fitting or accoutrement, diagrammatically illustrated at 242, which protrudes horizontally from the shallow end, or where it is desired to omit connection means from ends 232.

Figure 10:
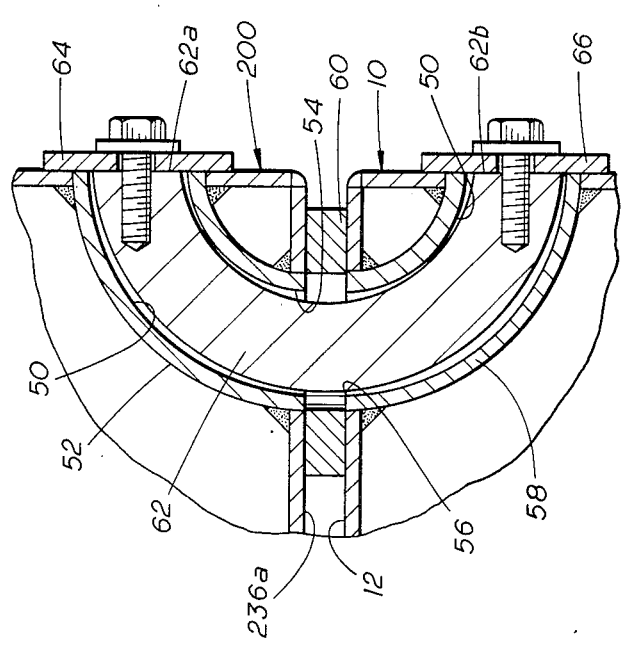
FIG. 10 is a detail sectional view on line 10—10 of FIG. 9.

In order to explain this secondary connection, it is necessary to note that a part of the internal structure of each component 10, 200 or 200' includes arcuate channels with open ends shown at 50. When a rake component such as 200 is emplaced in the position described, on top of the general component 10, two of these openings 50 on the components 10 and 200, respectively, are aligned as shown in FIG. 9. As shown in FIG. 10, the channel 52 of the component 200 has another opening 54 at its other end opening through the bottom portion 236a of the rake component. Likewise, the arcuate channel 58 in component 10 has another opening 56 through the top 12 of the component which, in the configuration of the transport assembly, directly opposes opening 54. A spacer ring 60, of the same thickness as flanges 46 of the primary connection means, is placed in surrounding relationship to openings 56 and 54 and between components 200 and 10. Then, an arcuate connector 62, having closed or solid ends 62a and 62b, is passed through the aligned channels 52 and 58 thus linking the two components. Prior to such emplacement, a plate 64 can be screwed onto the end surface 62a. After emplacement, a similar plate 66 can be screwed to the end surface 62b.

Thus, this particular secondary connection means is very convenient, since it makes use of already existing internal arcuate channels of the constructions components, and since it uses only small and simple parts. However, it should be understood that numerous other types of secondary connections between the rake components and general components can be employed.

Indeed, the primary connections at the outer end corners of the rake and general components, respectively, can also be varied, as can the means for connecting the shallow ends of the rake components, in those embodiments in which they are connected. For example, means such as shown in FIGS. 14–17 of prior application Ser. No. 757,631 can be used.

Numerous other modifications of the present invention may occur to those of skill in the art. Accordingly, it is intended that the invention be limited only by the claims which follow.

What is claimed is:

1. A construction transportation assembly comprising:
    a buoyant general construction component of generally rectangular parallelepiped configuration and having mutually perpendicular length, width and depth, first and second oppositely directed bases extending along the length and width, first and second oppositely directed sides extending between the bases along the length and depth, and first and second oppositely directed ends extending between the bases along the width and depth:
    two buoyant rake components each having mutually perpendicular length, width and depth, first and second oppositely directed bases extending along the length and width, first and second oppositely directed sides extending between the bases along the length and depth, and deep and shallow oppositely directed ends extending between the bases along the width and depth, said first base comprising a generally planar surface extending substantially from end to end and side to side, said second base having a first portion comprising a generally planar surface generally parallel to said first base and extending from side to side and from said deep end part way along the length, and a second portion adjoining said first portion and extending from said first portion to said shallow end, said second portion being inclined toward said first base from the juncture of said first and second portions to said shallow end;
    one of said rake components being disposed with one of its bases facing said first base of said general component, its deep end adjacent the first end of said general component, and its shallow end between the ends of said general component;
    the other of said rake components being disposed with one of its bases facing said first base of said general component, its deep end adjacent the second end of said general component, and its shallow end between the ends of said general component adjacent the shallow end of said one rake component;
    said rake components lying within the rectangular profile of said first base of said general component and being releasably connected to said general component.

2. The assembly of claim 1 wherein the length of said general component generally corresponds to the length of an ISO standard freight container, and the width of said general component generally corresponds to the width of an ISO standard freight container.

3. The assembly of claim 2 wherein the widths of said rake components correspond to the width of said general component, at least at the deep ends of said rake components.

4. The assembly of claim 3 wherein the widths of said rake components are generally uniform along their lengths.

5. The assembly of claim 4 wherein the deep ends and sides of each of said rake components are generally planar and perpendicular to the respective first base.

6. The assembly of claim 5 wherein the second portion of the second base of each of said rake components is generally planar.

7. The assembly of claim 3 wherein the facing bases of said general component and said rake components have contiguous corner portions, said rake components being so connected to said general component by primary connection means cooperative between said contiguous corner portions.

8. The assembly of claim 7 wherein said corner portions are provided with ISO standard corner fittings, and said primary connection means are of a type for interconnecting ISO standard freight containers.

9. The assembly of claim 7 further comprising secondary connection means interconnecting said rake components adjacent their shallow ends.

10. The assembly of claim 7 further comprising secondary connection means interconnecting each of said rake components to said general component inboard of the ends of said general component.

11. The assembly of claim 1 wherein said one base of each of said rake components is its second base, the first portion of said second base lying parallel to and adjacent the first base of said general component.

12. A construction transportation assembly comprising:
- a buoyant general construction component having eight corner portions defining a rectangular parallelepiped locus with a length and a width generally corresponding to those of an ISO standard freight container;
- and two specialty components mounted on top of said general component laterally adjacent each other and lying within the length and width of said locus, said specialty components being rake components, each having a deep end and a shallow end, one of said rake components being disposed with its deep end adjacent one end of said general component and its shallow end between the ends of said general component, and the other of said rake components being disposed with its deep end adjacent the other end of said general component and its shallow end between the ends of said general component adjacent the shallow end of said one rake component.

13. The assembly of claim 12 wherein each of said specialty components has two corner portions, each such corner portion of said specialty components being disposed adjacent a respective one of the four upper corner portions of said general component, said specialty components being so connected to said general component by primary connection means cooperative between said adjacent corner portions.

14. The assembly of claim 13 wherein said adjacent corner portions are provided with ISO standard corner fittings, and said primary connection means are of a type for interconnecting ISO standard freight containers.

15. The assembly of claim 14 further comprising secondary connection means interconnecting said specialty components to each other.

16. The assembly of claim 14 further comprising secondary connection means interconnecting each of said specialty components to said general component inboard of the ends of said general component.

* * * * *